(12) United States Patent
Perlman

(10) Patent No.: US 9,927,890 B1
(45) Date of Patent: Mar. 27, 2018

(54) COMPUTER MOUSE ASSEMBLY HAVING AN INTEGRATED, TELESCOPING, ADJUSTABLE GEL PAD WRIST SUPPORT

(71) Applicant: Perry Perlman, Lantana, FL (US)

(72) Inventor: Perry Perlman, Lantana, FL (US)

( * ) Notice: Subject to any disclaimer, the term of this patent is extended or adjusted under 35 U.S.C. 154(b) by 0 days.

(21) Appl. No.: 15/348,060

(22) Filed: Nov. 10, 2016

(51) Int. Cl.
| | |
|---|---|
| *G06F 3/0354* | (2013.01) |
| *G06F 3/039* | (2013.01) |
| *A47B 21/03* | (2006.01) |
| *G06F 3/033* | (2013.01) |
| *G06F 1/16* | (2006.01) |

(52) U.S. Cl.
CPC .......... *G06F 3/039* (2013.01); *A47B 21/0371* (2013.01); *G06F 3/03543* (2013.01); *A47B 2021/0385* (2013.01); *G06F 1/169* (2013.01); *G06F 1/1656* (2013.01); *G06F 3/033* (2013.01); *G06F 3/03549* (2013.01); *G06F 2203/0333* (2013.01)

(58) Field of Classification Search
CPC ........ G06F 1/1656; G06F 1/169; G06F 3/033; G06F 3/03543; G06F 3/03549; G06F 2203/0333
See application file for complete search history.

(56) References Cited

U.S. PATENT DOCUMENTS

| | | | | |
|---|---|---|---|---|
| 5,826,842 A | * | 10/1998 | Paulse | G06F 3/0395 248/118.1 |
| 5,865,404 A | * | 2/1999 | Hesley | G06F 3/039 248/118 |
| 5,865,405 A | * | 2/1999 | Hesley | B68G 5/00 248/118 |
| 5,868,365 A | * | 2/1999 | Hesley | G06F 3/03543 248/118 |
| 5,913,497 A | * | 6/1999 | Myers | A47B 21/0371 248/118.5 |
| 6,115,028 A | * | 9/2000 | Balakrishnan | G06F 3/03543 345/157 |
| 6,396,478 B1 | * | 5/2002 | Kravtin | G06F 3/03543 248/118.1 |
| 6,844,871 B1 | * | 1/2005 | Hinckley | G06F 3/0317 345/163 |
| 2005/0212771 A1 | * | 9/2005 | Leung | G06F 3/03543 345/163 |
| 2005/0253805 A1 | * | 11/2005 | Kennedy | G06F 3/039 345/156 |
| 2005/0275621 A1 | * | 12/2005 | Saez | G06F 3/03543 345/156 |
| 2010/0090953 A1 | * | 4/2010 | Loomis | G06F 3/039 345/163 |
| 2012/0073481 A1 | * | 3/2012 | Scott | G06F 3/0395 108/185 |
| 2013/0154931 A1 | * | 6/2013 | Chen | G06F 3/0395 345/163 |

* cited by examiner

*Primary Examiner* — Michael J Eurice

(57) ABSTRACT

A computer controlled pointing device having, a telescoping wrist support integral with and associated with the pointing device, so as to permit adjustable extension and retraction from the pointer device housing, to accommodate the preferred support position of an individual user's wrist. The means from effecting such adjustable incremental extension and retraction of the wrist support includes coupling means for releasable locking of the wrist support in a fixed position relative to the housing of the pointing device.

6 Claims, 6 Drawing Sheets

COMPUTER MOUSE ASSEMBLY HAVING AN INTEGRATED, TELESCOPING, ADJUSTABLE GEL PAD WRIST SUPPORT

BACKGROUND OF THE INVENTION

1. Field of the Invention

This invention relates to a graphical interface pointing device, which is manipulated by hand, and to a method for support of a wrist, with a gel pad support, that is annexed to and integrated within such device. The gel pad support of this integrated assembly is extendable/telescoping from the pointing devices, to accommodate an individual user's wrist position vis-A-vis the pointing device. More specifically, this invention relates to an improved pointing device, (preferably hand controlled), that detects two-dimensional motion, relative to a surface, and translates the motion of the pointing device, via a graphical interface, to a movable icon (e.g. virtual pointer) on a graphical display. The motion of this hand controlled, (preferably movable), pointing device, in the form of a computer mouse, is typically manifest, via a graphical computer interface, to a virtual pointer located on a display, which allows a smooth control of the virtual pointer on the display. The movement of the hand typically implicates repetitive movement of the wrist, and causes strain upon the wrist.

In the embodiment of this invention, the pointing device comprises a mouse having a body that can be manipulated by hand on a surface (mouse pad), and includes one or more buttons and a scrolling wheel. This invention also has application to a so-called "trackball" pointing device, consisting of a stationary body, having a ball held by a socket containing sensors, which can detect a rotation of the ball about two axes —like an upside-down mouse with an exposed protruding ball. The user rolls the ball with the thumb, fingers, or the palm of the hand to move a pointer, which is translated into the motion of a pointer on a display. Compared with a mouse, a trackball has no limits on effective travel; at times, a mouse can reach an edge of its working area while the operator still wishes to move the pointer farther. With a trackball, the operator just continues rolling, whereas a mouse would have to be lifted and re-positioned. Some trackballs have notably low friction, as well as being made of dense material such as glass, so they can be rotated. The trackball's buttons may be situated to that of a mouse or to a unique style that suits the user.

2. Description of the Prior Art

The advent of the computer pointing device for the placement and manipulation of a pointer on a computer screen has become common place with the adoption of a graphical interface; and, is used virtually exclusively by professionals and individuals alike, in combination with desktop computers. It is well documented, and need not be belabored, that the extensive use of the computer pointing devices for pointer control of a computer mouse often requires movement of the shoulder and arm, in addition to the wrist, hands and fingers. Furthermore, computer mice must often be lifted and repositioned on the mouse pad in order to properly position the pointer. These extra motions are fatiguing to the shoulder and neck areas and/or irritating to the user's wrist, and can further contribute to Carpal Tunnel Syndrome. Computer mice users tend to rest their wrists on a hard desk surface, the edge of the mouse pad, or the edge of a desk. Irrespective of the chosen resting position, the user's wrist typically rests on a surface that is irritating to the wrist; and in a position such that the wrist is forced to bend, both of which are contributing factors to Carpal Tunnel Syndrome. In comparison to computer mice, trackballs require less desk space and are easily incorporated into computer keyboards and portable computers, e.g., laptop or notebook computers. Notwithstanding, the user's wrist also typically rests on a surface, that is irritating to the wrist, and in a position such that the wrist is forced to bend, both of which are contributing factors to Carpal Tunnel Syndrome.

In order to obviate some of the discomfort and irritation to the wrist, a gel pad support is typically used, either independent of a mouse pad, or in combination with a mouse, to provide support to the wrist. The gel pad can be independent of the mouse pad, integrated with the mouse, or associated with some other desk top accessory. Obviously, the gel pad support remains relatively stationary, and the wrist support is limited and often incomplete when the mouse is moved.

In order to obviate the limitations of stationary wrist support, the prior art has suggested the combination of a computer pointing device and various support accessories to reduce the stress/strain on the wrist from repetitive movement of the pointing device.

U.S. Pat. No. 5,433,467 (to Rice, issued Jul. 18, 1995), is representative of this combination. The Rice patent discloses a computer mouse with a palm rest integral with and/or extending from the mouse body. The height of the palm rest can associated with the Rice computer mouse is adjustable (See FIGS. 5A & B, and Rice accompany description thereof).

U.S. Pat. No. 8,451,225 (to Loomis, issued May 28, 2013) is yet another representative embodiment of this combination. Loomis specifies a "resilient" material his support for the heel of hand and wrist support.

Additional teaching in the patent literature disclose similar variants of the foregoing, and include, by way of example, U.S. Pat. Nos. 5,340,067; 6,193,196, and 2003/0169236.

In each of the proposed devices, the pointing is associated in some fashion with a support that is connected to the rear of the device, so as to position the support to correspond with the heel of the hand and/or with the heel of hand and the wrist. The stated ostensible purpose of the support to relieve or reduce muscle or ligament stress and injures, modifying the posture of the user's forearm. Notwithstanding, the suggested mechanical extension of the mouse body and/or the extension therefrom, none of these contrivances have proven practical for one or more reasons, e.g. increase the drag upon the movement of the mouse, and/or do not adequately limit or immobilize the wrist and/or are physically obtrusive (large footprint).

Accordingly, there continues to exist a need for an effective accessory to a computer pointing device to relieve or reduce muscle or ligament stress and injures relative to one's wrist, including modifying the posture of the user's forearm, and yet not interfere with the movement of operation of the pointing device. Moreover, to be effective, the accessory is preferably integrated within the pointing device and be otherwise ergonomically neutral relative to the pointing device.

OBJECTS OF THE INVENTION

It is the object of this invention to remedy the above as well as related deficiencies in the prior art.

More specifically, it is the principle object of this invention to provide a gel pad integrated into hand controlled pointing device, wherein the movement thereof is translated into the motion of a pointer on a display, without stress and strain on the user's wrist.

It is another object of this invention to provide gel pad integrated into hand controlled pointing device, wherein the movement of the pointing device is translated into the motion of a pointer on a display, while maintaining user wrist support and the user's wrist in a neutral position, relative to the position of the pointing device.

It is yet another object of this invention to provide a gel pad integrated into a hand controlled pointing device, wherein the movement of the pointing device is translated into the motion of a pointer on a display, while maintaining wrist support and the wrist in a neutral position, relative to the position of the pointing device.

It is still yet another object of this invention to provide a telescoping gel pad extending from integrated and into a hand controlled pointing device, wherein the movement the pointing device is translated into the motion of a pointer on a display, while maintaining wrist support, and the wrist in a neutral position, relative to the position of the pointing device.

Additional objects of this invention include a method for operation of interactive data exchange, capable of data management of digital information from various enterprise clients and formats.

SUMMARY OF THE INVENTION

The above and related objects are achieved by providing improved, manually controlled pointing device, such as mouse or trackball, having a (a) housing containing electro-mechanical means for manual positioning and manipulating a graphical pointing device on a computer display, and (b) a telescoping gel pad wrist support, which is physically coupled to and associated with the said housing of the pointing device. The telescoping gel pad wrist support includes a gel pad integrated within a recess on the surface of said wrist support. The telescoping gel pad wrist support can be adjusted relative to the hand position on the pointing device, to provide the most effective support and comfort.

In one of the preferred embodiments of this invention, the telescoping wrist support is associated with the pointing device, so as to permit adjustable extension and retraction from the pointer device housing, to accommodate the preferred support position of an individual user's wrist. The means from effecting such adjustment provide for incremental extension and retraction of the wrist support; and, for the locking of the support in a fixed position, relative to the housing of the pointing device. Obviously, the ability to both adjust the relative position of wrist support and to lock it in a fixed position, relative to the housing of the pointing device, is more critical where the wrist support is associated with a moveable mouse, than in the case of a trackball.

In another of the preferred embodiments of the invention, the telescoping wrist support has top-side, comprising an essentially ergonomic shape for supporting a user's wrist, during use of a pointing device; and, a concave, or arcuate, under-side, for minimizing the contact of the wrist support with a mouse pad or a desk surface, so as to reduce sliding resistance or drag between the wrist support and mouse pad or a desk surface resistance during use. In this embodiment of the invention, the top-side of the wrist support has a gel pad integral with the top-side of the wrist support, to provide for enhanced wrist support and comfort. The under-side of the support is also preferably provided with a plurality of sliders to reduce the frictional forces between the under-side of the wrist support and a mouse pad or a desk surface. In this preferred embodiment of the invention, the ergonomic shape of the pointing device and the wrist support are complimentary to one another, and thereby provide a symmetry that is compatible with bilateral use/movement (right and left handed) of the pointing device.

In another of the preferred embodiments of this invention, the wrist support include a battery, and a USB adaptor, for use in the wireless communication of the pointing device with a portable electronic device having a built in display.

The preferred features described above can be used in any one of a number of combinations, in the improved, hand controlled pointing device of this invention.

DETAILED DESCRIPTION OF THE INVENTION INCLUDING PREFERRED EMBODIMENT

Figure 1:
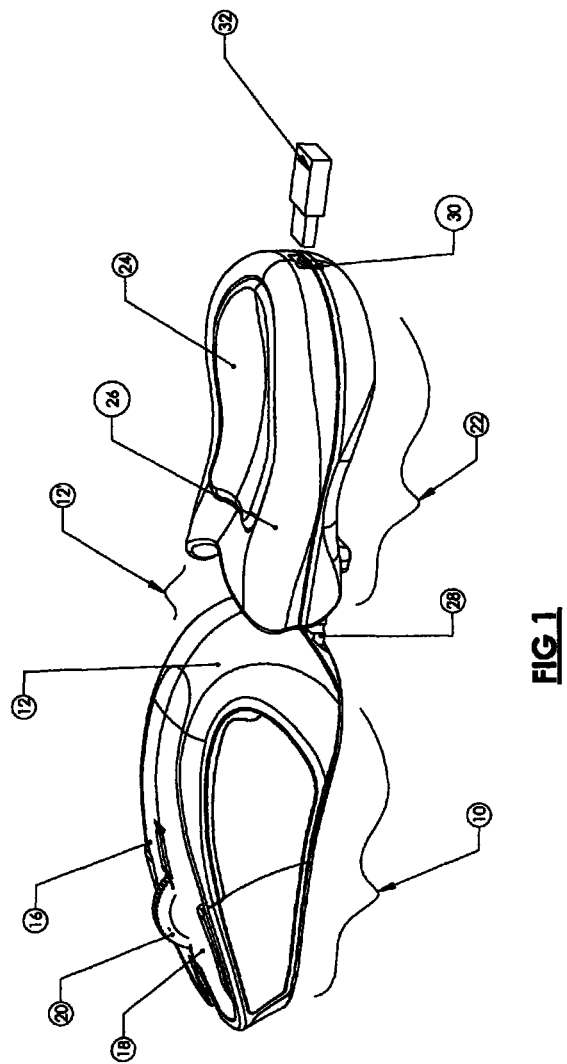
FIG. 1 depicts a perspective view of the improved, hand controlled computer mouse, pointing device of this invention when viewed from above.

As understood within the context of this invention, the following terms and phrases are intended to have the following meaning unless otherwise indicated.

The term "Mouse" or phrase "Computer Mouse", as used herein, is understood to include a manually (hand control) controlled pointing device that detects two-dimensional motion relative to a surface. This motion is typically communicated to a computer which translated the motion of the pointing device into the motion of a virtual pointer on a display, which allows a smooth control of the graphical user interface. Physically, the mouse consists of an object held in one's hand, with one or more buttons and a wheel on the top side thereof. Mice can also feature other elements, such as manually switches and "wheels", which enable additional control and dimensional input.

The term "Trackball" or phrase "Computer Trackball", as used herein, is understood to include a stationary pointing device consisting of a free-wheeling bail which is nested and thereby retained with a socket, having a number of sensors to detect a rotation of the ball about two axes. The user simply rolls the ball with the thumb, fingers, or the palm of the hand to move a pointer digital pointer of a graphical display. Compared with a mouse, a trackball has no limits on effective travel; at times, a mouse can reach an edge of its working area while the operator still wishes to move the screen pointer farther. With a trackball, the operator just continues rolling, whereas a mouse would have to be lifted and re-positioned. Trackballs have notably low friction, as well as being made of dense material such as glass, so they can be rotated. The trackball's buttons may be positioned to that of a mouse, or to a unique style that suits the user. Large track balls are common on CAD workstations for easy precision. Before the advent of the touchpad, small track balls were common on portable computers, where there may be no desk space on which to run a mouse.

The phrase "Wrist Support" as used herein is understood to include an adjustable accessory affixed to a computer pointing device comprising a gel filled pad or cushion, which is both integral with a computer pointing device can be extended and retracted relative to the computer pointing device, to relieve or reduce muscle or ligament stress and injures relative to one's wrist, including modifying the posture of the user's forearm, and yet not interfere with the movement of the operation of the pointing device.

The term "Gel Pad" as used herein is understood to include a cushion having a closed fabric envelope containing an elastomer gel material, typically comprising a low viscosity components at room temperature. The gel is commonly prepared from a variable ratio polyurethane gel essentially devoid of plasticizer to avoid hardening after prolonged use.

The representative, and preferred embodiments of this invention, are described herein by reference to the patent drawings, which are hereinafter described in detail.

Figure 2:
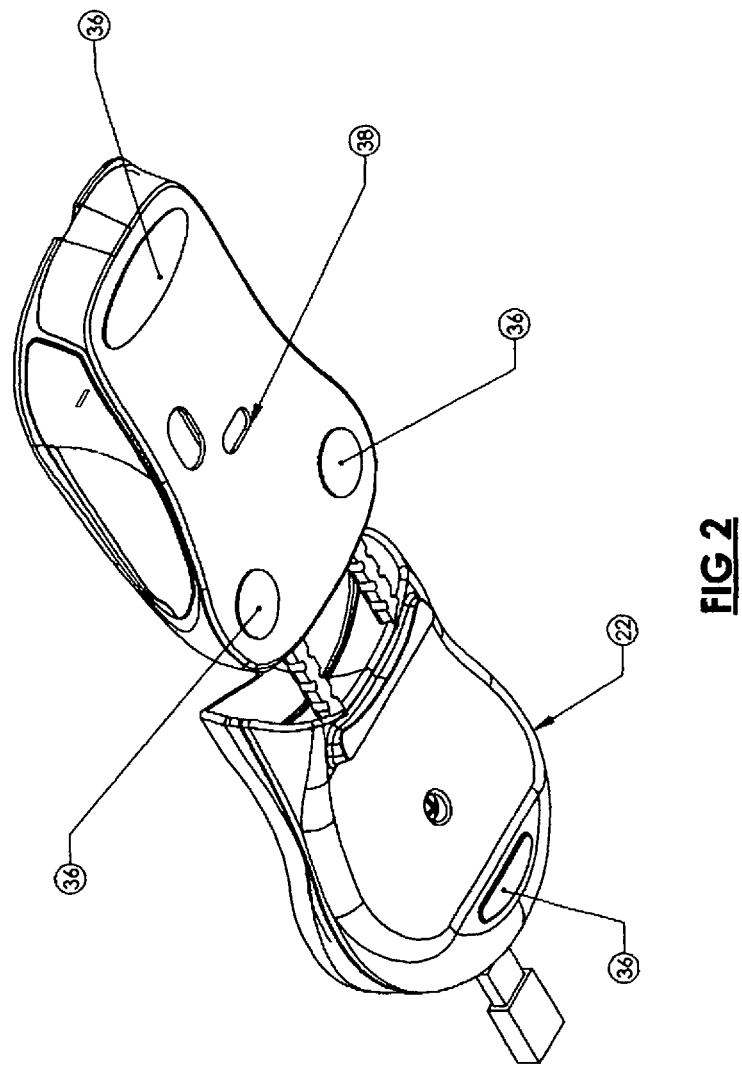
FIG. 2 depicts the improved, band controlled computer mouse, pointing device of FIG. 1, when viewed from the below.

FIG. 1 depicts a perspective view of an improved, hand controlled pointing device of this invention from above specifically, a computer mouse (10) having a body or housing (12) containing the optical sensor (not shown), on the underside thereof (FIG. 2 (38)), for detection of the movement of the mouse, relative to a surface (e.g. mouse pad); and, a telescoping gel pad wrist support (22). In the perspective view of the device of this invention illustrated in FIG. 1, the computer mouse (10), includes a right click contact switch (16) a left click contact switch (18) and a scroll wheel (20). Physically coupled to, extending from the rear of the housing (12) of the mouse (10), is a wrist support (22), which includes an integrated gel pad (24) nested on the top side (26) of the wrist support, and secured within a recess in the topside (26) of the wrist support (22). The wrist support (22), illustrated in this FIG. 1, is partially extended from, and projects from the rear (12') of the housing (12) of the computer mouse (10). The relative position of the wrist support (22) to the computer mouse (10) is maintained by a pair of rods (FIG. 5-28, 28'), which are integrated in, and extend from the wrist support (22). Each of these rods (28, 28') include molded or surface features for engaging with complimentary features with in the housing (12), to effect securing the wrist support (22), in a relative fixed position, to the computer mouse (10).

In the embodiment of the invention illustrated in FIG. 1, the wrist support (22) includes a USB port (30) for receipt of a computer mouse accessory (32). In this case, the computer mouse accessory (32) is a wireless communication device or transmitter, for communication of the relative movement of computer mouse (10) on a mouse pad, as detected by an optical sensor, as illustrated in FIG. 2 on the underside of the mouse, to a computer with a display equipped with graphical interface.

FIG. 2 is a perspective view of the improved, hand controlled pointing device of this invention of FIG. 1, from below. In this FIG. 2, the computer mouse (10) is provided with an optical window (38) for an optical sensor; and, the wrist support (22) with an array of gliders (36, 36'), arranged so as to provide a fiction reducing contact between the wrist support (22), and a mouse pad or flat surface such as a table top. The underside of the wrist support (22) has a concave or arcuate recess (34) for minimizing the contact of the wrist support (22) with a mouse pad or flat surface, thereby, the amount of sliding resistance or drag between the wrist support (22) and mouse pad or a flat surface during use.

Figure 3:
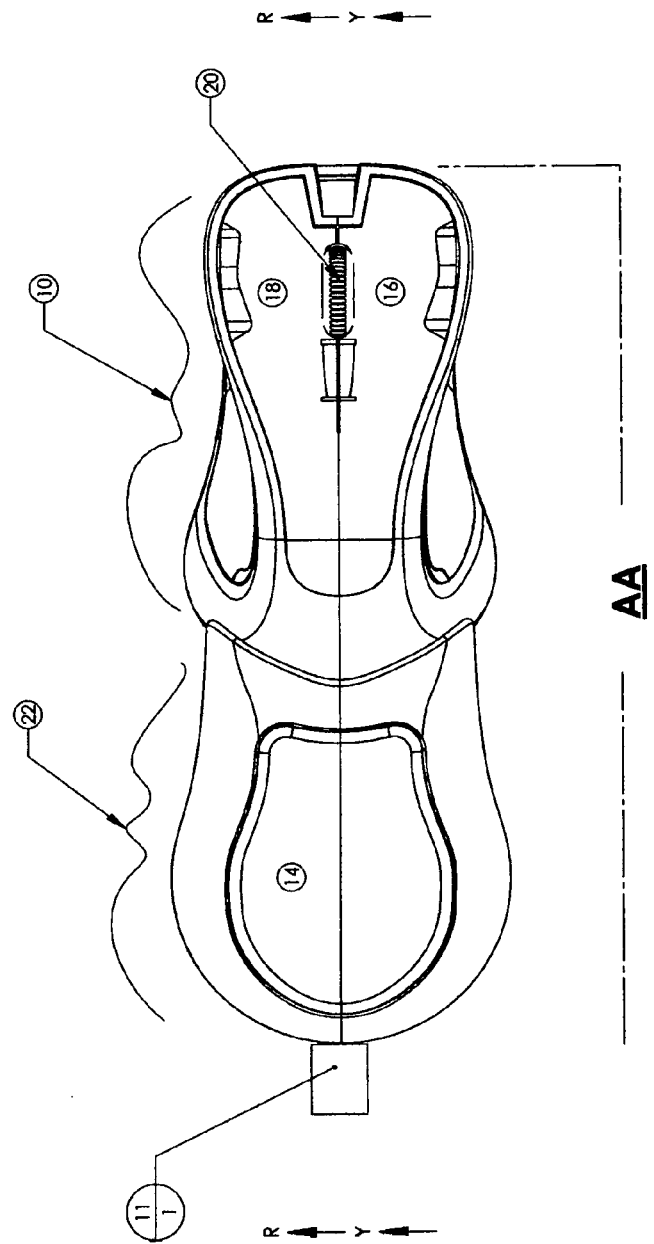
FIG. 3 depicts is a top plan view of the improved, hand controlled computer mouse, pointing device, of FIG. 1.

FIG. 3 is a plan, top side, view of the improved, hand controlled pointing device of this invention of FIG. 1, from above. In FIG. 3, the wrist support (22) is docked in a fully retracted position relative to a computer mouse (10). In this retracted position, telescoping rods are fully engaged with complementary locking means within the mouse body. In this FIG. 3, the gel pad (14') is retained within the recess in the gel pad wrist support (14). The size and shape of the gel pad can vary with the size of the wrist of the user and desired comfort. The size can be adjusted to accommodate different users. The basic symmetry of the combination of the wrist support (22) and computer mouse (10) is also readily apparent. The symmetry of the combination of the wrist support (22) and computer mouse (10), along a defined axis, of plane, AA, insures that wrist movement is restricted to a minimum, and only to lateral movements. In this FIG. 2, the scroll wheel (20) is located along the same axis (midline) of the computer mouse.

Figure 4:
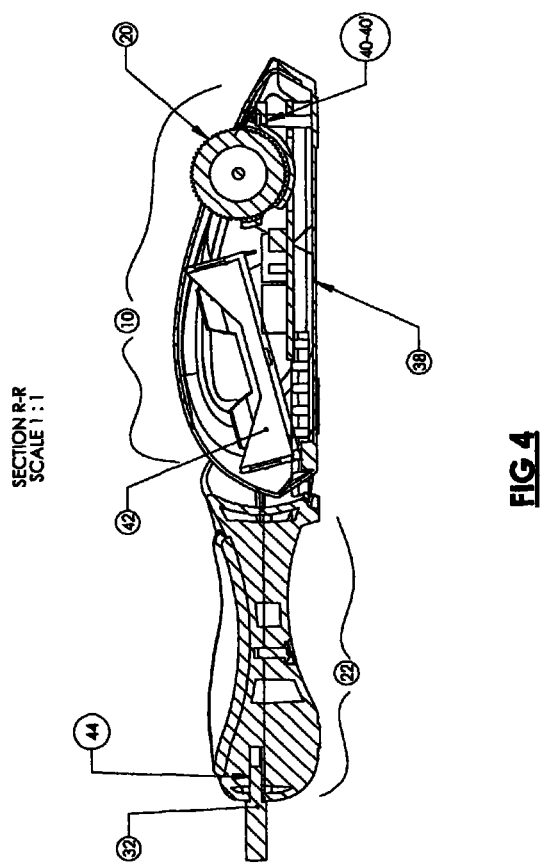
FIG. 4 depicts a cross-section the improved, hand controlled computer mouse, pointing device of FIG. 3, along plane AA.

FIG. 4 is a cross-sectional view of the computer mouse (10) and wrist support (22), of FIG. 3, along the midline thereof at section line AA. In this FIG. 4, the relative position of the internal functional features of the computer mouse (10) and wrist support (22) are shown in relation to one another. In this FIG. 4, the wrist support (22) is in the fully retracted position. This sectional view of computer mouse (10) depicts an optical window (38) in the underside of the mouse for the optical sensor (not shown) within the computer mouse (10). In addition, the scroll wheel (20) is shown relative to motion sensors (40, 40'), for translating the movement of the wheel to linear movement of the pointer on a graphic display. In this embodiment of the invention, the wrist support includes a USB port (44) and the computer mouse 10 includes a battery bay (42).

Figure 5:
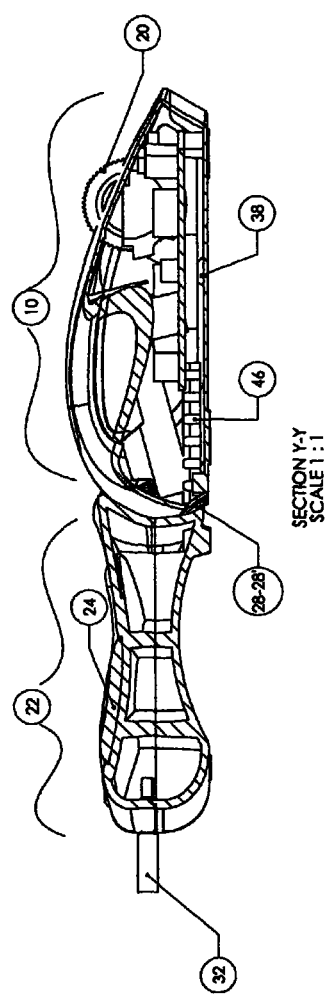
FIG. 5 depicts a partial exploded view, when viewed from the side, of the improved, hand controlled computer mouse, pointing device of FIG. 1, in the engagement of the telescoping extensions of the wrist pad and the pointing device housing.

FIG. 5 is partial section of the improved, hand controlled pointing device (10) of this invention of FIG. 1. In this illustration, a portion of the computer mouse (12) and wrist support (22) has been cut away revealing the one of the pair of telescoping rods (28, 28'), which extend from the wrist support (22) into the rear of the housing of the computer mouse (10). In this FIG. 5 telescoping rods (28, 28') extends from the wrist support (22) into the computer mouse (10), so as to engage a complimentary coupling means (46). In this FIG. 5, the telescoping rod is provided with a plurality of complimentary peaks (hills) and grooves (valleys) within a receiver or dock in the mouse.

Figure 6:
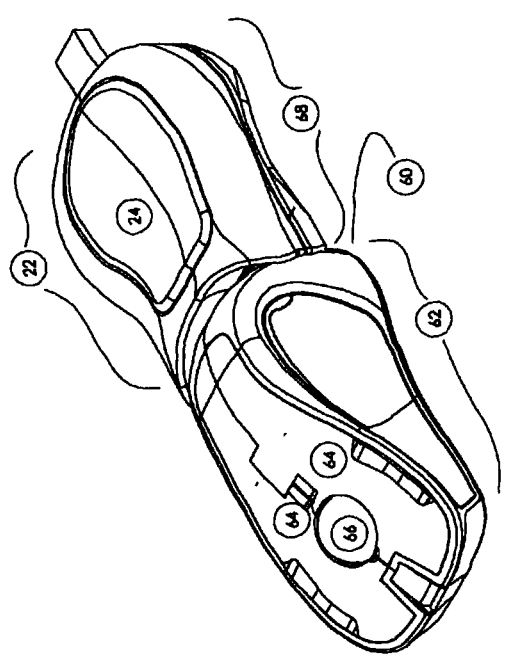
FIG. 6 depicts a perspective view of the improved, hand controlled trackball pointing device of this invention.

FIG. 6 depicts improved, hand controlled trackball pointing device (60) of this invention, when viewed from above and from the front. In this embodiment of the invention the trackball pointing device (60) includes a stationary base (62), a series of pressure sensitive switches (64, 64) for executing "right clicking" and "left clicking" commands for cursor movement or graphical interface actions, and trackball (66) nested in a cradle (not shown) within the stationary base (62). The trackball base (62) is also integral with a wrist support (68), capable of telescoping extension from and retraction into the stationary base (62). The components of wrist support (68), specifically, its structure, function and operation, are virtually the same as the illustrated and describer for wrist support (22), in FIGS. 1-5 above.

As the trackball (66) is manually manipulated within the cradle (66), the relative movement thereof is translated by sensors (not shown) within the stationary base (62) to cursor/pointing movement on a graphical display associated, through a computer, with the movement of the trackball (66).

The foregoing has been provided by way of example and illustration of sonic of the preferred embodiments of this invention and is not intended to delineate its scope, which is set forth in the claims which follow.

What is claimed is:

1. A computer mouse for computer controlled movement of an icon on a graphic display, wherein said computer mouse includes:
   a manually controlled pointing device and a telescoping wrist support extending therefrom,
   said manually controlled pointing device comprising:
      a receiver for engaging telescoping rods of said telescoping wrist support, said receiver comprising complimentary peaks and grooves for releasable locking and unlocking said telescoping rods,
      wherein said manually controlled pointing device comprises circuitry for detection of relative movement, or changes in position, of a stationary optical sensor within said manually controlled pointing device,
   said telescoping wrist support comprising:
   two separate and independent telescoping rods extending from and integrated into said telescoping wrist support, wherein each of said telescoping rods comprising a plurality of complementary peaks and grooves for incrementally engaging with said receiver of said manually controlled pointing device;
      a concave top-side support comprising a removable cushion nested into a recess in said concave top-side, designed to support a wrist of a user during operation of said computer mouse,
      a concave under-side comprising a plurality of sliders designed to reduce a frictional force developed between the concave under-side of said telescoping wrist support and a mouse pad or desk surface.

2. The computer mouse of claim 1, wherein said removable cushion comprises a gel pad.

3. The computer mouse of claim 1, wherein said telescoping wrist support further comprises a USB accessory port designed for a wireless communication transmitter.

4. The computer mouse of claim 1, wherein said manually controlled pointing device further comprises a battery bay.

5. The computer mouse of claim 1, wherein said manually controlled pointing device further comprises a scroll wheel and a plurality of pressure sensitive switches.

6. The computer mouse of claim 1, wherein said manually controlled pointing device further comprises a trackball and a plurality of pressure sensitive switches.

* * * * *